US006397112B1

(12) United States Patent
Coatesworth

(10) Patent No.: US 6,397,112 B1
(45) Date of Patent: May 28, 2002

(54) ZONE ADAPTIVE CELL BREAKDOWN

(75) Inventor: Timothy A. Coatesworth, Lake Orion, MI (US)

(73) Assignee: Chrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/217,287

(22) Filed: Dec. 18, 1998

(51) Int. Cl.[7] ................................................ G05B 13/02

(52) U.S. Cl. ......................................... 700/37; 711/170

(58) Field of Search .............................. 700/28, 29, 30, 700/37, 71; 701/36; 711/158, 159, 170, 173; 714/718, 722

(56) References Cited

U.S. PATENT DOCUMENTS

| | | | | |
|---|---|---|---|---|
| 4,843,556 A | * | 6/1989 | Wakeman et al. | 364/431.08 |
| 5,003,944 A | | 4/1991 | Moote et al. | 123/299 |
| 5,003,952 A | | 4/1991 | Weglarz et al. | 123/478 |
| 5,003,953 A | | 4/1991 | Weglarz et al. | 123/478 |
| 5,159,660 A | | 10/1992 | Lu et al. | 395/22 |
| 5,361,213 A | | 11/1994 | Fujieda et al. | 364/431.08 |
| 5,479,571 A | | 12/1995 | Parlos et al. | 395/21 |
| 5,490,236 A | | 2/1996 | Niki | 395/23 |
| 5,566,314 A | | 10/1996 | DeMarco et al. | 395/430 |
| 5,625,557 A | * | 4/1997 | Colosky | 364/424.04 |

* cited by examiner

*Primary Examiner*—Paul P. Gordon
(74) *Attorney, Agent, or Firm*—Edwin W. Bacon, Jr.

(57) ABSTRACT

A method is provided for updating an array of data point cells in a surface or table representation of memory. The three-dimensional surface array is modeled as a square bordered by four cells with one cell at each corner. Between each array corner cell, the array spacing is typically divided into three zones. As such, nine sub-regions of the array square are defined. Depending upon which of the nine sub-regions the calculated error point falls into when accessing the array, different cells are updated. In the case of a two-dimensional table array, typically three sub-regions are defined between adjacent cells. Depending upon which sub-region the calculated error point falls into, one or both of the table array cells is updated. As a further feature of the present invention, the amount of adaptive gain applied to each cell to be updated is adjusted depending upon which sub-region the calculated error point falls within.

20 Claims, 1 Drawing Sheet

ZONE ADAPTIVE CELL BREAKDOWN

BACKGROUND OF THE INVENTION

1. Technical Field

The present invention generally relates to a method of updating data points in a memory and, more particularly, to a method of updating an adaptive surface or table representing an area of memory such as that of an engine control unit of a motor vehicle.

2. Discussion

While the following discussion is directed toward an automotive technology, the present invention is not so limited and has broad application to any field involving the updating of adaptive memory cells. Many platforms, such as automotive vehicles have standard components which are controlled by a generically programmed controller. For example, automotive vehicles typically include an engine and an engine controller. For any particular vehicle model, a generically programmed engine controller is installed so as to accommodate the general operating characteristics of the type of engine installed in that vehicle model.

To program the controller, a pre-selected number of controlled components, such as the engines in the automotive example above, are tested for certain operating characteristics. Thereafter, each controller is programmed to accommodate the identified general characteristics. However, component-to-component variances may give rise to certain discrepancies between a specific controller's programming and the associated component's actual performance.

To accommodate the discrepancies, most platforms are equipped with feedback-type systems to detect and temporarily correct such errors. For instance, a automotive vehicle may include sensors for detecting errors between an engine controller's volumetric efficiency control surface and the vehicle engine's actual volumetric efficiency. Although feedback systems may correct for errors on a temporary basis, should the error persist for a given period of time, it is sometimes advantageous to modify the overall controller program settings to adjust the component's actual operating parameters. In this way, the error is compensated for, and thereby eliminated, without always relying on the feedback system.

To account for such persistent discrepancies, a controller memory may be updated so that its programming is adapted to the associated component's true performance. To accomplish this, the controller memory may be modeled as a plurality of cells in the form of a three-dimensional surface or a two-dimensional table wherein each cell represents a data point of the memory. In the automotive environment, a three-dimensional surface having engine speed as a first or X-input and engine load as a second or Y-input may be used to define a surface representative of volumetric efficiency. For airflow through the throttle, voltage may be used as an X-input to define a two-dimensional table.

According to the prior art, after various sensors define a persistent error between component performance and controller programming, the error is used to update a single cell in the surface or table. This is accomplished by using a calculated point based on X and Y inputs to access the three-dimensional surface (or X input of the two-dimensional table). The cell closest to the calculated point is then updated using an error value based on the distance between the calculated point and the closest cell. However, when the calculated point falls between two adjacent cells, learned errors are sometimes associated with the wrong cell. For example, when the calculated point falls on one side of the mid-point between adjacent cells, only the closest one cell is updated.

In view of the foregoing, it would be desirable to provide a method of updating memory cells (i.e., data points) such that more than one cell can be updated simultaneously depending upon the location of the calculated point relative to the cells. It would also be desirable to weigh the amount each cell is updated during the updating step according to the proximity of the calculated point to the adjacent cells.

SUMMARY OF THE INVENTION

The above and other objects are provided by a method of updating an array of cells in a surface or table representative of memory. The three-dimensional surface array is modeled as a square bordered by four cells with one cell at each corner. Between each array corner cell, the array spacing is divided into three zones. As such, nine sub-regions of the array square are defined. Depending upon which of the nine sub-regions a calculated point based on an operational parameter falls into when accessing the array, different cells are updated. In the case of a two-dimensional table array, three sub-regions are defined between adjacent cells. Depending upon which sub-region the calculated point falls into, one or both of the table array cells is updated. It should also be noted that the dimensions of each sub-region may be selected such that the calculated point is more or less likely to fall within certain sub-regions.

As a further feature of the present invention, the amount of adaptive gain applied to each cell to be updated is adjusted depending upon which sub-region the calculated point falls within.

BRIEF DESCRIPTION OF THE DRAWINGS

In order to appreciate the manner in which the advantages and objects of the invention are obtained, a more particular description of the invention will be rendered by reference to specific embodiments thereof which are illustrated in the appended drawings. Understanding that these drawings only depict preferred embodiments of the present invention and are not therefore to be considered limiting in scope, the invention will be described and explained with additional specificity and detail through the use of the accompanying drawings in which.

DETAILED DESCRIPTION OF THE PREFERRED EMBODIMENTS

The present invention is directed towards a method of updating data points stored in a memory location. According to the present invention, an error associated with an operational parameter of a platform in which the memory is located is used to update the data points of the memory. More particularly, the memory is modeled as a three-dimensional surface or two-dimensional table having a plurality of cells representing each data point of memory. Depending on the location of a calculated point corresponding to an operational parameter relative to the cells, one or more cells, and therefore one or more data points, is updated.

Figure 1:
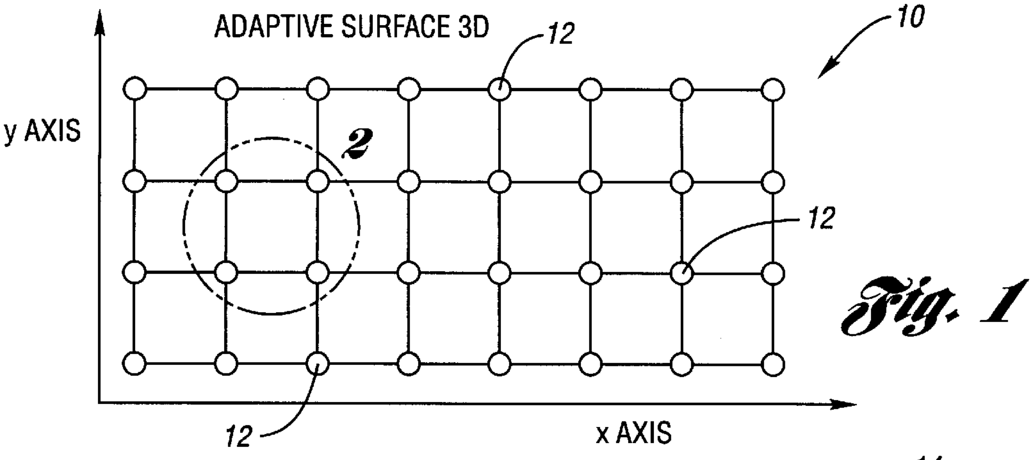
FIG. 1 is a graphical illustration of a three-dimensional surface.

Turning now to the drawing figures, FIG. 1 illustrates a three-dimensional surface 10. The three-dimensional surface 10 is a model of a memory location such as an engine controller. The three-dimensional surface 10 includes a plurality of columns and rows, each containing a plurality of spaced-apart cells 12. Each cell 12 represents a data point of the memory.

The three-dimensional surface 10 is accessed via the X and Y axes. For instance, assuming that the memory is part of an engine controller installed in an automotive vehicle, the X axis may be representative of engine speed while the Y axis is representative of engine load. As such, the three-dimensional surface 10 could represent volumetric efficiency learning.

Figure 2:
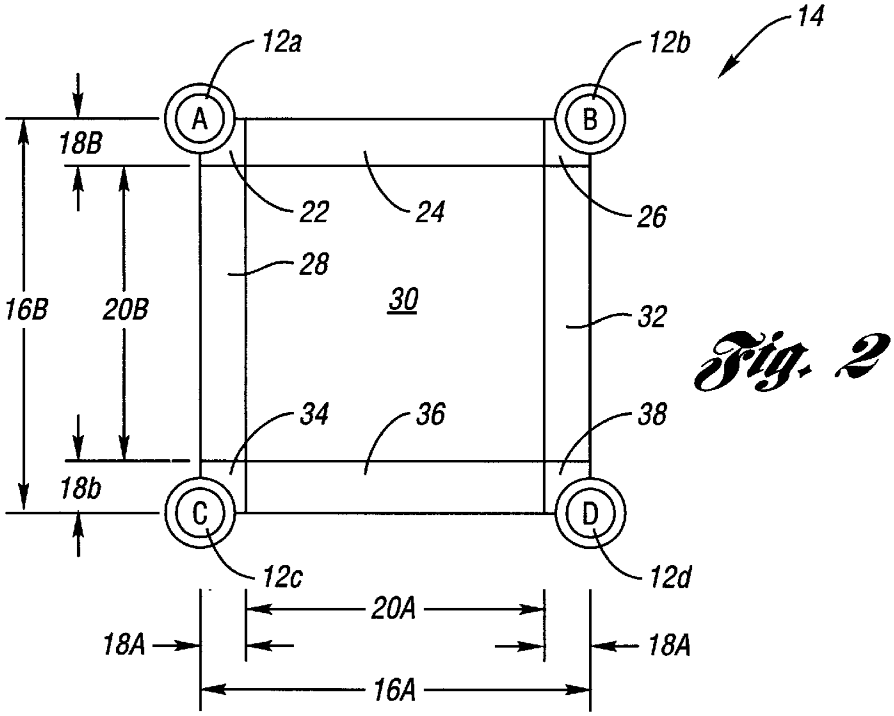
FIG. 2 is a more detailed view of an array of cells of the three-dimensional surface of FIG. 1.

Turning now to FIG. 2, a more detailed view of an array of cells 14 from the three-dimensional surface 10 of FIG. 1 is illustrated. Each cell 12*a*–12*d* forms a corner of the array 14 and represents a single data point of memory. In accordance with the teachings of the present invention, the space 16A between adjacent cells 12*a* and 12*b* is sub-divided into three regions, first and second regions 18A, and a third region 20A. Likewise, the space 16B between adjacent cells 12*a* and 12*c* is subdivided into three regions, first and second regions 18B, and a third region 20B. As such, the area of the array 14 is divided into nine sub-regions including corner sub-region 22, side sub-region 24, corner sub-region 26, side sub-region 28, middle sub-region 30, side sub-region 32, corner sub-region 34, side sub-region 36, and corner sub-region 38.

As can be appreciated, the size of first and second regions 18A and B and third regions 20A and B are fractions of spaces 16A and B. The spaces 16A and B are fixed and are converted from the cells 12*a–d* by means of an interpolation table. As such, the distance between adjacent cells 12*a* and 12*b,* or 12*a* and 12*c,* may be defined as follows:

space 16=first region 18+third region 20+second region 18; or, since first region 18=second region 18;

space 16=2* first region 18+third region 20.

Although one skilled in the art will appreciate that the actual dimensions of the first and second regions 18 and third region 20 are selected based on a compromise between speed and stability, it is presently preferred to select the first and second regions 18 as between 0 and 50% of the space 16 and the third region 20 as the remainder. More preferably, each of the first and second regions 18 are 10 to 20% of the space 16 while the third region 20 is 60–80%. Most preferably, each of the first and second regions 18 are 15% of the space 16 and the third region 20 is 70%.

Referring now collectively to FIGS. 1 and 2, the three-dimensional surface 10 is updated according to the present invention in the following manner. Initially, a particular array of cells, such as the array 14, is referenced by means of a calculated point based on the X and Y axes of the three-dimensional surface 10. This will identify the cells, such as cells 12*a*–12*d,* requiring updating.

If the calculated point falls within a corner sub-region 22, 26, 34, or 38 of the array 14, only the adjacent cell is updated. Thus, if the calculated point falls within corner sub-region 22, cell 12*a* is updated. If the calculated point falls within corner sub-region 26, cell 12*b* is updated. If the calculated point falls within corner sub-region 34, cell 12*c* is updated. If the calculated point falls within corner sub-region 38, cell 12*d* is updated.

However, if the calculated point falls within a side sub-region 24, 28, 32, or 36, of the array 14, both adjacent cells are updated. Thus, if the calculated point falls within side sub-region 24, cells 12*a* and 12*b* are updated. If the calculated point falls within side sub-region 28, cells 12*a* and 12*c* are updated. If the calculated point falls within side sub-region 32, cells 12*b* and 12*d* are updated. If the calculated point falls within side sub-region 36, cells 12*c* and 12*d* are updated.

Finally, if the calculated point falls within the center sub-region 30 of the array 14, all four cells 12*a*–12*d* are updated.

As can be appreciated from the above, for cell 12*a* to be updated, the calculated point must fall within corner sub-region 22, side sub-region 24, side sub-region 28 or middle sub-region 30. For cell 12*b* to be update, the calculated point must fall within side sub-region 24, corner sub-region 26, middle sub-region 30 or side sub-region 32. For cell 12*c* to be updated, the calculated point must fall within side sub-region 28, middle sub-region 30, corner sub-region 34, or side sub-region 36. For cell 12*d* to be updated, the calculated point must fall within middle sub-region 30, side sub-region 32, side sub-region 36 or corner sub-region 38.

As a further feature of the present invention, the amount each cell 12*a*–12*d* is updated or adapted by depends upon which sub-region 22–38 of the array 14 the calculated point falls within. That is, the adaptive multiplier to be applied to any cell 12*a*–12*d* is equal to the error term multiplied by an adaptive gain. In this case, the error term is an external input (i.e., a calculation based on the vehicle sensors) and the adaptive gain preferably equals one of the following:

0–10% in middle sub-region 30;

15–25% in side sub-regions 24, 28, 32, and 36; and

80–100% in corner sub-regions 22, 26, 34, and 38.

Even more preferably, the amount of adaptive gain equals:

5% in middle sub region 30;

20% in side sub-regions 24, 28, and 36; and

90% in corner sub-regions 22, 26, 34, and 38.

As such, the amount of adaptive gain applied to any cell 12*a*–12*d* is adjusted depending upon how close the calculated point is to an existing cell value. Stated another way, the updating step is weighed according to the confidence that an adjacent cell requires adaption. For this reason, the dimensions of the sub-regions 22–38 are selected as described above such that only calculated points falling very close to a cell cause that cell to be aggressively updated. Calculated points falling between two cells cause the adjacent cells to be moderately updated. Finally, when calculated points fall between all four cells, each cell is only slightly updated. However, in each case the new data cell value will equal the old data cell value plus the error term multiplied by the adaptive gain (e.g., 5%, 20% or 90%). For example, a vehicle operating in sub-region 24 would cause the following updates:

New 12*a*=Old 12*a*+Error*0.2;

New 12*b*=Old 12*b*+Error*0.2;

New 12*c*=Old 12*c;* and

New 12*d*=Old 12*d.*

Figure 3:
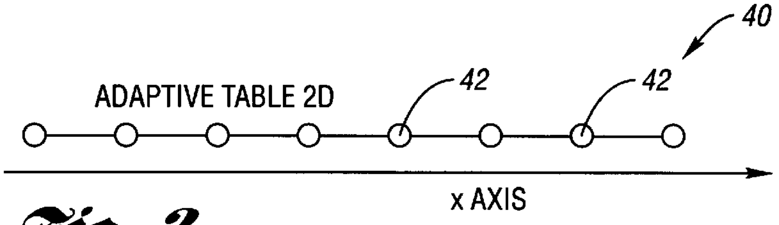
FIG. 3 is a graphic illustration of a two-dimensional table.

Turning now to FIG. 3, a two-dimensional table 40 is illustrated. The two-dimensional table 40 is similar to the three-dimensional surface 10 of the first embodiment but only includes an X input rather than an X and Y input. The table 40 includes a row containing a plurality of cells 42. Each cell 42 represents a data point of a memory location which the table 40 is modeling.

The two-dimensional table 40 is accessed via the X axis. For instance, assuming that the memory is part of an engine controller installed in an automotive vehicle, the X axis may be representative of throttle voltage. As such, the two-dimensional table 40 could represent throttle air flow learning.

Figure 4:
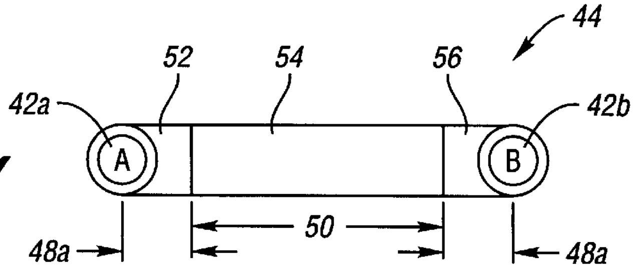
FIG. 4 is a more detailed view of an array of cells of the two-dimensional table of FIG. 3.

Turning now to FIG. 4, a more detailed view of an array of cells 44 of FIG. 3 is illustrated. Each cell 42*a* and 42*b* forms an end of the array 44 and represents a single data point of memory. In accordance with the teachings of the present invention, the space 46 between adjacent cells 42*a* and 42*b* of array 44 is sub-divided into three regions, first and second regions 48*a,* and a third region 50. As such, the area of the array is divided into three sub-regions including end sub-region 52, middle sub-region 54, and end sub-region 56.

As can be appreciated, the size of first and second regions 48*a* and third region 50 are fractions of space 46. The space 46 is fixed and is converted from cells 42*a* and 42*b* by means of an interpolation table. As such, the distance between cells 42*a* and 42*b* may be defined as:

space 46=first region 48*a*+third region 50+second region 48*a;* or, since first region 48*a*=second region 48*a;* space 46=2*first region 48*a*+third region 50.

As described above, one skilled in the art will appreciate that the actual dimensions of the first and second regions 48*a* and third region 50 are selected based on a compromise between speed and stability. However, it is presently preferred to select each of the first and second regions 48*a* as between 0 and 50% of the space 46 and the third region 50 as the remainder. More preferably, each of the first and second regions 48*a* are 10 to 30% of the space 46 while the third region 50 is 40–80%. Most preferably, each of the first and second regions 48*a* are 20% of the space 46 and the third region 50 is 60%.

Referring now collectively to FIGS. 3 and 4, the array 44 of the two-dimensional table 40 is updated in the following manner. Initially, a particular array of cells such as the array 44, is referenced by means of a calculated point based on the X axis of the two dimensional table 40. This will identify the cells, such as cells 42*a* and *b,* requiring updating.

If the calculated point falls within either end region 52 or 56 only the adjacent cell is updated. Thus, if the calculated point falls within end region 52, only cell 42*a* is updated. Similarly, if the calculated point falls within the end region 56 only cell 42*b* is updated. However, if the calculated point falls within the middle region 54, both adjacent cells 42*a* and 42*b* are updated. Therefore, for cell 42*a* to be updated, the calculated point must fall within end region 52 or middle region 54. For cell 42*b* to be updated, the calculated point must fall within the middle region 54 or end region 56.

As with the method of updating a surface described above, the amount that each cell 42 of the table 40 is updated corresponds to the proximity of the calculated point to the cells of the accessed array. Thus, the amount each cell is updated or adapted by is equal to an error term multiplied by an the adaptive gain. In this case, the error term is an external input (i.e., a calculation based on the vehicle sensors). As an example, the adaptive gain is preferably between 40 and 60% when the calculated point falls within the middle region 54 and is between 80 and 100% when the calculated point falls within either end region 52 or 56. More preferably, the adaptive gain is 50% when the calculated point falls within the middle region 54 and is 95% when the calculated point falls within end region 52 or 56. Accordingly, the amount of adaptive gain applied to cell 42*a* or 42*b* of array 44 is adjusted depending upon how close the calculated point is to an existing cell value. In either case, the new cell value equals the old cell value plus the error multiplied by the adaptive gain. For example, if the vehicle is operating in zone 54, then the memory cells are updated as follows:

New 42*a*=Old 42*a*+Error*0.5;

and

New 42*b*=Old 42*b*+Error*0.5.

Thus, the present invention provides a method of updating the data points of a memory location by modeling the data points as a plurality of cells in the form of a three-dimensional surface or two-dimensional table. Depending upon the location of the calculated point relative to an array of cells within the surface or table different data point cells are updated. Further, the amount of adaptive gain applied to each updated cell is varied depending on the proximity of the calculated point relative to the cells.

Those skilled in the art can now appreciate from the foregoing description that the broad teachings of the present invention can be implemented in a variety of forms. For example, while the arrays above have been sub-divided into nine and three sub-regions respectively, only two or more sub-regions are required. Therefore, while this invention has been described in connection with particular examples thereof, the true scope of the invention should not be so limited since other modifications will become apparent to the skilled practitioner upon a study of the drawings, specification, and following claims.

What is claimed is:

1. A method of updating an array of data points in a memory location comprising:

sub-dividing said array of data points into a plurality of sub-regions;

referencing said array via a calculated point; and updating selected ones of said data points according to a location of said calculated point relative to said plurality of sub-regions.

2. The method of claim 1 wherein said array further comprises a region of a three-dimensional surface bordered by four data points.

3. The method of claim 2 wherein said plurality of sub-regions further comprise nine sub-regions of said region.

4. The method of claim 3 wherein said nine sub-regions include first, second, third, and fourth corner sub-regions, first, second, third, and fourth side sub-regions, and a middle sub-region.

5. The method of claim 4 wherein said selected ones of said data points further comprise a first data point if said calculated point falls within said first corner, first side, second side, or middle sub-region.

6. The method of claim 4 wherein said selected ones of said data points further comprise a second data point if said calculated point falls within said second corner, first side, third side, or middle sub-region.

7. The method of claim 4 wherein said selected ones of said data points further comprise a third data point if said calculated point falls within said third corner, second side, fourth side, or middle sub-region.

8. The method of claim 4 wherein said selected ones of said data points further comprise a fourth data point if said calculated point falls within said fourth corner, third side, fourth side, or middle sub-region.

9. The method of claim 1 further comprising varying an amount each of said selected ones of said data points is updated during said updating step according to said location of said calculated point relative to said sub-regions.

10. The method of claim 9 wherein said varying step further comprises applying a first gain to said selected ones of said data points during said updating step if said calculated point falls within a first, second, third, or fourth corner sub-region, applying a second gain to said selected ones of said data points during said updating step if said calculated point falls within a first, second, third, or fourth side sub-region, and applying a third gain to said selected ones of said data points during said updating step if said calculated point falls within a middle sub-region.

11. The method of claim 10 wherein said first gain is within a range of approximately 80–100% said second gain is within a range of approximately 15–25%, and said third gain is within a range of approximately 0–10%.

12. The method of claim 9 wherein said varying step further comprises applying a first gain to said selected ones of said data points during said updating step if said calculated point falls within a first or second end sub-region, and applying a second gain to said selected ones of said data points during said updating step if said calculated point falls within a middle sub-region.

13. The method of claim 12 wherein said first gain is within a range of approximately 80–100%, and said second gain is within a range of approximately 40–60%.

14. The method of claim 1 wherein said array further comprises a region of a two-dimensional table bordered by two data points.

15. The method of claim 14 wherein said plurality of sub-regions further comprise three sub-regions of said region.

16. The method of claim 15 wherein said three sub-regions include a first end, second end, and middle sub-region.

17. The method of claim 16 wherein said selected ones of said data points further comprise a first data point if said calculated point falls within said first end or middle sub-region.

18. The method of claim 16 wherein said selected ones of said data points further comprise a second data point if said calculated point falls within said second end or middle sub-region.

19. A method of updating an array of four data points from a three-dimensional surface memory location comprising:

sub-dividing said array into nine sub-regions including a first, second, third, and fourth corner sub-regions with each said corner sub-region containing one of said data points, first, second, third, and fourth side sub-regions, and a middle sub-region;

referencing said array via a calculated point based on an actual operating parameter;

determining which one of said sub-regions contains said calculated point;

updating at least one of said data points as a function of said determination wherein said updating further comprises:

incrementing a data point contained in one of said corner sub-regions if said calculated point and said data point fall together within one of said corner sub-regions, said data point being incremented by an error term times a first gain;

incrementing two of said data points contained in two of said corner sub-regions if said calculated point falls within a side region adjacent to both of said two corner sub regions, said two data points being incremented by an error term times a second gain; and incrementing said four data points if said calculated point falls within said middle sub-region, said four data points being incremented by an error term times a third gain.

20. A method of updating an array of two data points from a two-dimensional table memory location comprising:

sub-dividing said array into three sub-regions including a first and second end sub-regions and a middle sub-region;

referencing said array via a calculated point based on an actual operating parameter;

determining which one of said sub-regions contains said calculated point;

updating at least one of said data points as a function of said determination wherein said updating further comprises:

incrementing a data point contained in one of said end sub-regions if said calculated point and said data point fall together within one of said end sub-regions, said data point being incremented by an error term times a first gain; and incrementing said two data points if said calculated point falls within said middle sub-region, said two data points being incremented by an error term times a second gain.

* * * * *